United States Patent
Witney

(10) Patent No.: US 10,682,729 B2
(45) Date of Patent: Jun. 16, 2020

(54) SYSTEM FOR AUTOMATED IN-PROCESS INSPECTION OF WELDS

(71) Applicant: General Electric Company, Schenectady, NY (US)

(72) Inventor: Andrew Batton Witney, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 269 days.

(21) Appl. No.: 14/955,348

(22) Filed: Dec. 1, 2015

(65) Prior Publication Data

US 2017/0151634 A1 Jun. 1, 2017

(51) Int. Cl.
*B23K 31/12* (2006.01)
*B23K 9/28* (2006.01)
(Continued)

(52) U.S. Cl.
CPC ............ *B23K 31/125* (2013.01); *B23K 9/028* (2013.01); *B23K 9/0956* (2013.01); *B23K 9/167* (2013.01); *B25J 9/163* (2013.01); *B25J 19/021* (2013.01); *F01D 5/02* (2013.01); *G01B 5/0037* (2013.01); *G01B 11/24* (2013.01); *G01N 29/04* (2013.01); *B23K 2201/001* (2013.01); *F05D 2230/235* (2013.01); *F05D 2240/24* (2013.01); *G01N 2291/267* (2013.01); *Y10S 901/42* (2013.01); *Y10S 901/47* (2013.01)

(58) Field of Classification Search
CPC ...... B23K 9/028; B23K 9/167; B23K 9/0956; B23K 31/125; B23K 2201/001; G01N 29/04; G01N 2291/267; F01D 5/02; G01B 5/0037; G01B 11/24; B25J 19/021; B25J 9/163; Y10S 901/42; Y10S 901/47; F05D 2240/24; F05D 2230/235
USPC .......................................................... 219/75
See application file for complete search history.

(56) References Cited

U.S. PATENT DOCUMENTS

| | | | | |
|---|---|---|---|---|
| 4,280,137 A | * | 7/1981 | Ashida | B23K 9/0956 |
| | | | | 219/124.34 |
| 4,491,719 A | * | 1/1985 | Corby, Jr. | B23K 9/0956 |
| | | | | 219/124.34 |

(Continued)

FOREIGN PATENT DOCUMENTS

| | | |
|---|---|---|
| EP | 1 679 656 | 7/2006 |
| JP | 2009-125790 | 6/2009 |
| JP | 2009125790 A | 6/2009 |

OTHER PUBLICATIONS

European Search Report dated Mar. 3, 2017 issued in European Patent Application No. 16201012.8, 6 pp.
(Continued)

*Primary Examiner* — Eric Stapleton
(74) *Attorney, Agent, or Firm* — Hoffman Warnick LLC

(57) ABSTRACT

A system and method detect weld defects in real time. Cameras capture images of a weld pool as well as ripple shape and fillet geometry. A processor receives the images and communicates with a database that stores correlated potential weld defects with images of a mock weld molten pool and images of a mock weld ripple shape and fillet geometry. The processor computes an aggregate probability that a weld position corresponding to the images captured by the cameras contains a defect based on the potential defects correlated in the database.

18 Claims, 4 Drawing Sheets

(51) Int. Cl.
*B23K 9/167* (2006.01)
*B25J 19/02* (2006.01)
*B25J 9/16* (2006.01)
*F01D 5/02* (2006.01)
*G01N 29/04* (2006.01)
*B23K 9/028* (2006.01)
*B23K 9/095* (2006.01)
*G01B 5/00* (2006.01)
*G01B 11/24* (2006.01)
*B23K 101/00* (2006.01)

(56) References Cited

U.S. PATENT DOCUMENTS

| | | | | |
|---|---|---|---|---|
| 4,532,408 A * | 7/1985 | Richardson | ......... | B23K 9/0956 219/124.34 |
| 4,578,561 A * | 3/1986 | Corby, Jr. | ............ | B23K 9/0956 219/124.34 |
| 4,595,820 A * | 6/1986 | Richardson | ......... | B23K 9/0956 219/130.01 |
| 4,611,111 A * | 9/1986 | Baheti | ................. | B23K 9/0956 219/124.34 |
| 4,649,426 A * | 3/1987 | Bolstad | ................ | B23K 9/0956 219/130.01 |
| 4,711,986 A * | 12/1987 | Lillquist | ................ | B23K 9/296 219/130.01 |
| 4,739,404 A * | 4/1988 | Richardson | .......... | B23K 9/0956 348/719 |
| 4,767,911 A * | 8/1988 | Maram | ................ | B23K 9/0732 219/130.01 |
| 4,943,702 A * | 7/1990 | Richardson | ......... | B23K 9/0956 219/124.34 |
| 5,061,841 A * | 10/1991 | Richardson | .......... | B23K 9/0956 219/130.01 |
| 5,275,327 A * | 1/1994 | Watkins | ............... | B23K 9/1274 219/124.34 |
| 5,745,593 A * | 4/1998 | Wahawisan | .......... | G01R 31/311 382/146 |
| 5,793,009 A * | 8/1998 | Offer | ..................... | B23K 9/164 219/136 |
| 6,084,205 A * | 7/2000 | Sheaffer | ............... | B23K 9/0956 219/130.21 |
| 6,701,615 B2 * | 3/2004 | Harding | ................. | B23P 6/002 29/402.07 |
| 7,006,669 B1 * | 2/2006 | Lavagnino | ............... | G06K 9/38 356/238.1 |
| 7,375,304 B2 * | 5/2008 | Kainec | .................... | B23K 9/10 219/130.01 |
| 7,853,435 B2 * | 12/2010 | Dodge | ................. | B23K 9/0953 702/183 |
| 8,144,193 B2 * | 3/2012 | Melikian | .................. | B23K 9/32 348/90 |
| 9,604,301 B2 * | 3/2017 | Zhang | .................. | B23K 9/0956 |
| 9,836,987 B2 * | 12/2017 | Postlethwaite | .......... | G09B 5/06 |
| 2004/0124227 A1 * | 7/2004 | Seki | ..................... | B23K 9/0953 228/103 |
| 2011/0117527 A1 * | 5/2011 | Conrardy | ............. | B23K 9/0956 434/234 |
| 2015/0056585 A1 * | 2/2015 | Boulware | ................ | B23K 9/16 434/234 |
| 2015/0062327 A1 * | 3/2015 | Suda | ..................... | G01B 11/24 348/90 |
| 2015/0235565 A1 * | 8/2015 | Postlethwaite | .......... | G09B 9/00 434/234 |
| 2015/0248845 A1 * | 9/2015 | Postlethwaite | ........ | G09B 19/24 434/234 |

OTHER PUBLICATIONS

European Search Report and Opinion issued in connection with corresponding EP Application No. 6201012.8 dated Mar. 3, 2017.

* cited by examiner

SYSTEM FOR AUTOMATED IN-PROCESS INSPECTION OF WELDS

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The invention relates to weld quality control and, more particularly, to in-process inspection of automated welding processes.

Manufacturers of turbine rotors and similar devices may utilize gas-tungsten-arc welding of component parts. Such welding improves mechanical properties including the ability to join components having different base materials as is often desirable in high-performance machines. Welding a turbine rotor, however, can take dozens of hours, and in order for the weld operators to identify a potential problem (e.g., a pore, lack of fusion, large silicate island, etc.) before it is welded over on the next pass, the operators must pay careful attention to every pulse made by their torch. It is a difficult task for a human operator to pay such close attention for such a long period of time.

Even assuming the weld operators may be capable of paying such close attention, weld operators typically do not have the experience to know exactly what they are looking for. An experienced welder may see features in the shape of the molten pool, the sidewall wetting geometry, the solidified ripple pattern and the solidified bead geometry that comparative amateurs do not see.

Most weld defects—e.g., pores, inclusions, lack of fusion, etc.—cannot be detected until testing such as ultrasonic testing is conducted on a finished weld. Detecting weld defects at the time they are created would save significant costs and cycle time. It would thus be desirable to utilize a "tireless" computer to pay close attention to the millions of weld pulses over the course of several days that it takes to weld a turbine rotor. It would further be desirable to utilize a machine vision system that is properly trained to watch these critical welds.

BRIEF SUMMARY OF THE INVENTION

In an exemplary embodiment, a method of detecting weld defects in real time includes a step of conducting a mock-up welding operation in a learning phase. The mock-up welding operating includes the steps of welding a first part to a second part, capturing images of a weld molten pool, and capturing images of a weld ripple shape and fillet geometry. The captured images are correlated with a weld position, and weld testing is performed on a weld resulting from the mock-up welding operation. Any defects in the weld are characterized, and the characterized defects are correlated with deviations in the captured images. During a production weld operation, the first camera captures images of a production weld molten pool, and the second camera captures images of a product weld ripple shape and fillet geometry. The captured images are processed to compute an aggregate probability that a weld position corresponding to the captured images contains a defect based on the correlated characterized defects.

In another exemplary embodiment, a method of detecting weld defects in real time includes the steps of (a) correlating potential weld defects with images of a mock weld molten pool and images of a mock weld ripple shape and fillet geometry; (b) depositing weld metal into an annular groove in a production weld operation; (c) a first camera capturing images of a production weld molten pool during the production weld operation; (d) a second camera capturing images of a production weld ripple shape and fillet geometry during the production weld operation; and (e) processing the images captured in (c) and (d) and computing an aggregate probability that a weld position corresponding to the images captured in (c) and (d) contains a defect based on the potential defects correlated in (a).

In still another exemplary embodiment, a system for detecting weld defects in real time includes a welding torch that enables weld metal to be deposited into an annular groove in a production weld operation, and first and second cameras. The first camera is positioned adjacent the welding torch and adjacent a part to be welded and captures images of a production weld molten pool during the production weld operation. The second camera is positioned farther from the welding torch than the first camera and downstream from the welding torch and captures images of a production weld ripple shape and fillet geometry during the production weld operation. A processor receives the images captured by the first and second cameras. The processor communicates with a database that stores correlated potential weld defects with images of a mock weld molten pool and images of a mock weld ripple shape and fillet geometry. The processor is programmed to process the images captured by the first and second cameras and to compute an aggregate probability that a weld position corresponding to the images captured by the first and second cameras contains a defect based on the potential defects correlated in the database.

DETAILED DESCRIPTION OF THE INVENTION

The system performs in-process (i.e., real-time) inspection of automated welding processes such as a process for welding a turbine rotor. As described in more detail below, the system includes digital cameras that collect video data in real-time, sensors that monitor process data (amps, volts, temperatures, etc.) in real-time, and an inspection/testing system that is used off-line during a learning phase. During the learning phase, the system correlates features in the video and/or process data with defects and "indications" detected by testing. In operation, the system analyzes real-time streams and computes a probability at any given moment that a defect has been created. Based on configurable probability thresholds, welding can be suspended for re-work as soon as the system detects a high probability that a defect has been produced.

Figure 1:
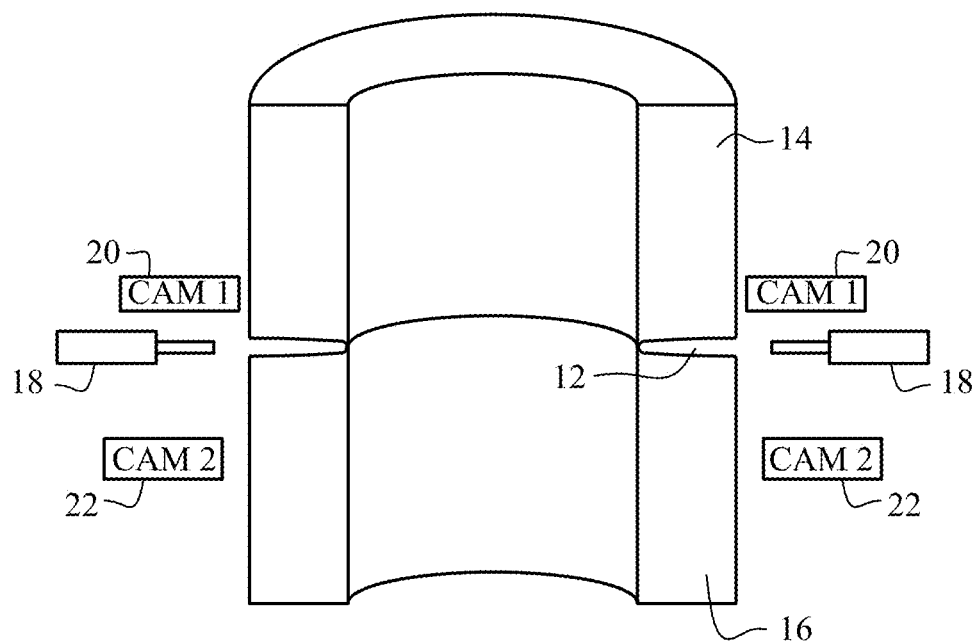
FIGS. 1 and 2 are schematic illustrations showing the components for automated in-process inspection of welds.
Figure 2:
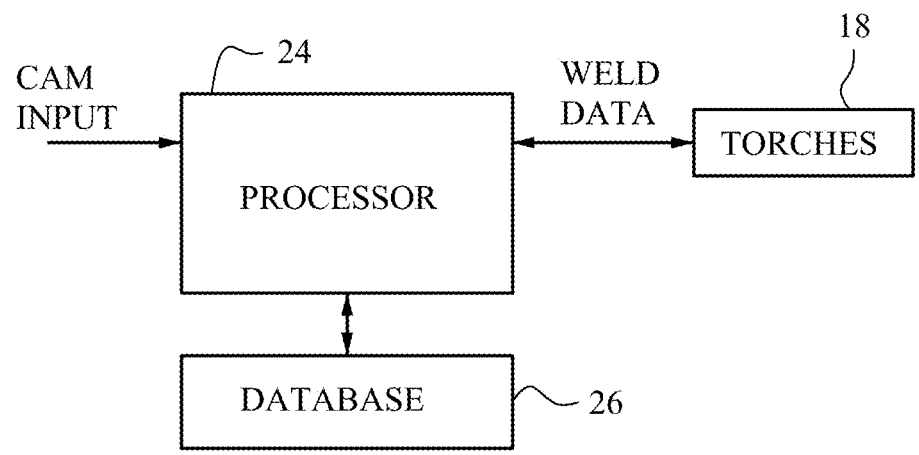

FIGS. 1 and 2 are schematic diagrams of the system for detecting weld defects in real-time. For purposes of the present description, weld metal is deposited into an annular groove 12 between a first part 14 and a second part 16. One or more welding torches 18, such as TIG (tungsten inert gas) welding torches for example, may be positioned adjacent the groove 12. In some embodiments, the welding torches 18 are held stationary, while the first and second parts 14, 16 are rotated. Alternatively, the welding torches 18 may be displaced circumferentially around the groove 12. The welding torches 18 include known sensors for weld data to measure physical characteristics of the weld, including, without limitation, gas flow values, temperature, welding current, voltage between torch and metal, circumferential position, radial position, etc.

A first camera 20 is positioned adjacent each welding torch 18 near the annular groove 12. A second camera 22 is positioned generally farther from each welding torch 18 than the first cameras 20 and downstream from the welding torches 18. By virtue of their proximity to the weld, the first cameras 20 must be able to withstand the high temperatures near the welding torches 18. The second cameras 22 are positioned farther from the heat generated by the torches 18 and thus do not require the same degree of heat resistance. The cameras 20, 22 capture digital video data at different stages of the weld process. Such cameras are known and available off-the-shelf, and further details of their structure and operation will not be described.

A processor 24 receives the images captured by the first and second cameras 20, 22 as well as the weld data. A database 26 communicates with the processor 24 and stores correlated potential weld defects with images of a mock weld molten pool and images of a mock weld ripple shape and fillet geometry from a learning phase (described below).

The first cameras 20 capture images including the edges of the molten weld pool, and the second cameras 22 capture downstream images of the solidified weld ripple and fillet geometry. Additional first cameras may be utilized to capture images of both the leading edge of the molten pool and the trailing edge of the molten pool. Sensors associated with the torches 18 collect the weld process data. The cameras 20, 22 may work with various wavelengths of light (infrared, visible, etc.). As each frame, or a subset of the incoming frames, of video is collected, algorithms parameterize the weld pool shape, the shape and location of refractory contaminants ("silicates" etc.) floating on the pool, solidified ripple shape and fillet geometry, and so on. Parameterization is done using best-fit polynomials or other functions.

Figure 4:
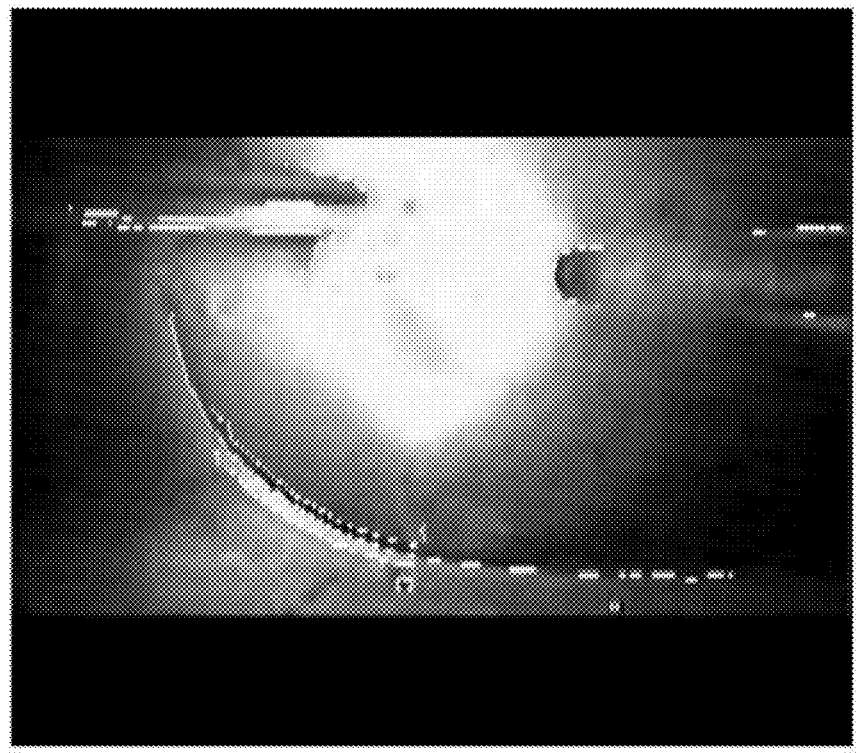
FIG. 4 is an exemplary image of a weld molten pool.

As a non-limiting example, edge-detection operators such as the well-known "Canny algorithm" may be used on frames of video to locate the boundaries of the weld pool, as illustrated by the curved white lines in FIG. 4. In terms of a suitable x-y coordinate system, the white lines delineating the leading edge of the weld pool in FIG. 4 are fit to a mathematical function such as an Nth-order polynomial. The mathematical fit parameters that approximate the shape of the leading edge of the pool in one video frame are compared with fit parameters of the same feature from reference ("learning phase") video and/or adjacent frames in the same video. Deviations from the norm, or unexpected sudden changes in the fit parameters are used to identify and quantify anomalous situations.

Process and video data are indexed to the weld position. In an exemplary application to the turbine rotor weld, weld metal is deposited in dozens of overlapping passes by the torches 18 that fill the annular groove 12 outward. In this context, weld position is determined by a circumferential angle and a radial depth.

Figure 3:
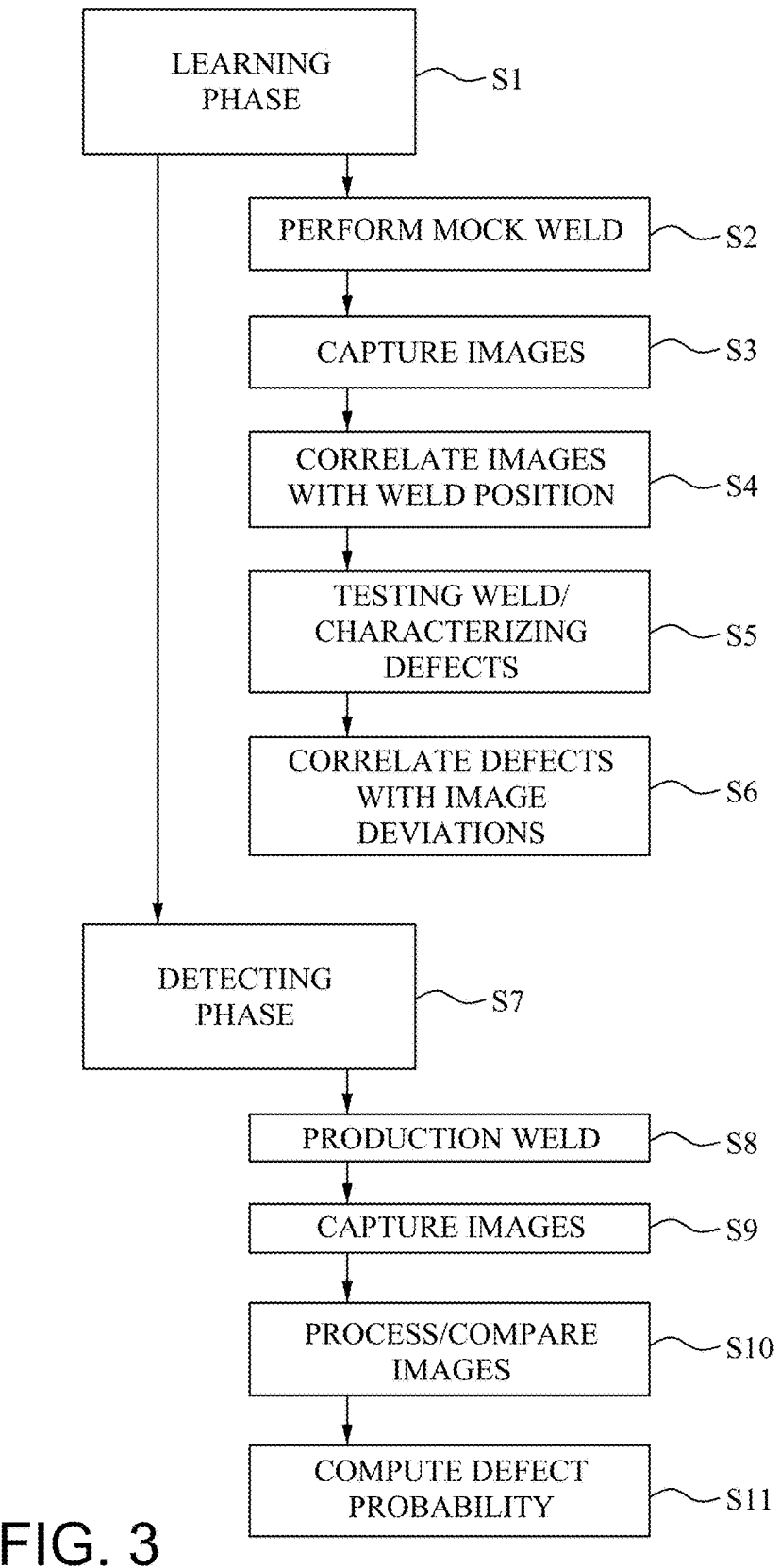
FIG. 3 is a flow diagram of the method for detecting weld defects in real time.

With reference to FIG. 3, during a learning phase (Step S1), a mock welding operation is conducted (S2). The first camera 20 captures images of the weld molten pool, and the second camera 22 captures images of the weld ripple shape and fillet geometry (S3). The captured images are correlated with a weld position (S4), and weld testing is performed on the resulting mock weld. The welds may be inspected off-line by ultrasonic testing and/or destructive methods to characterize any contained defect indications. For example, the testing can determine at each weld position defect size, type (pore, inclusion, lack of fusion, etc.), orientation (radial-axial, radial-circumferential, etc.), location (sidewall, surface-connected, etc.), etc. Analytical algorithms correlate features in the parameterized video and process data with indications observed by inspection. As an example, the release of a refractory silicate island disrupts the clean, consistent 2:00-to-8:00 ripple pattern shown in FIG. 5, and significantly alters the polynomial-fit parameters that best characterize this shape. Such a silicate also appears as a large axial-circumferential defect in an ultrasonic inspection. The magnitude of a deviation in fit parameters is correlated with the defect size determined by ultrasonic inspection of a defect at the same location in a given weld during the learning phase. This correlation forms the basis of the probabilistic estimate that a defect has been produced during the production phase of the system. Defects in the weld are characterized (S5). That is, they are sized by ultrasonic methods and/or exposed and measured by destructive methods such as metallography. The characterized defects are correlated or matched with deviations in the captured images (S6).

During the production weld process, weld defects are detected in real-time. While the production weld is formed (S8), the first and second cameras 20, 22 capture images of the production weld molten pool and the production weld ripple shape and fillet geometry, respectively (S9). The captured images are processed relative to, among other things, the images and correlations processed during the learning phase (S10), and an aggregate probability that a weld position corresponding to the captured images contains a defect is computed based on the characterized defects correlated at least in the learning phase (S11). Aggregate probability is a blended, weighted probability based on image analysis from the several cameras, as well as the process-parameter data gathered by the weld station. As a simplistic, non-limiting example, a sudden change in arc-voltage corresponding to a change in the distance between the tungsten and the workpiece may indicate a 20% chance that a silicate defect has been produced; meanwhile, video analysis may suggest a 35% chance that a silicate has been produced. In isolation, either of these two data points may not be sufficient to warrant investigation by the welders, but a near-simultaneous occurrence of these two events increases the aggregate probability tremendously.

It is possible during the learning phase to deliberately run the welding process outside normal parameters and artificially create defects to help train the system. In some cases, such as an inclusion produced when a silicate is shed from the weld pool and later welded over, the task of correlating video and process data with embedded defects has a high level of accuracy, leading to high-probability links between the data and the defect. In other cases, such as the subtle stack-up of several weld parameters that cause a sidewall lack of fusion, may be more difficult to identify by analytics, leading to low-probability correlations.

Figure 5:
FIGS. 5-6 are exemplary images of a weld ripple shape and fillet geometry.
Figure 6:
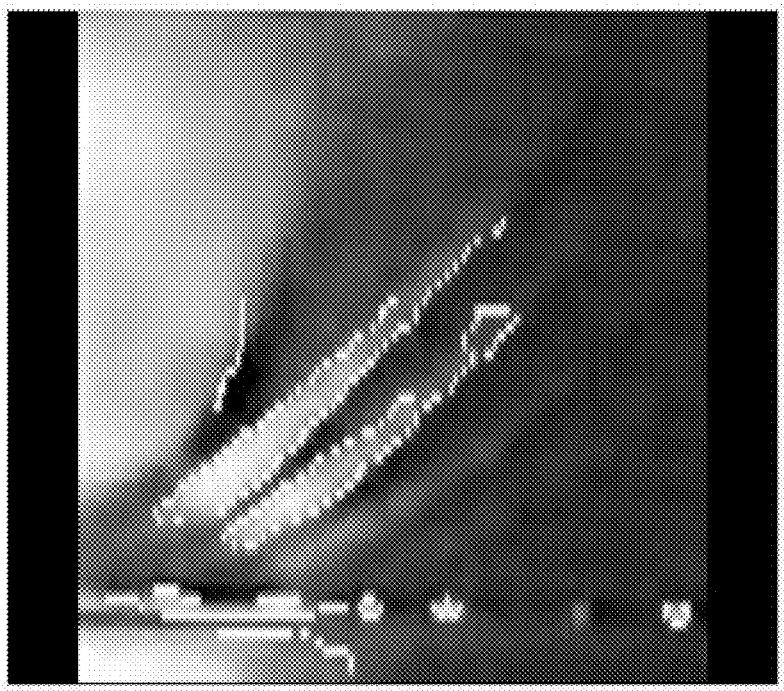

During production welding, the system computes an aggregate probability, in real-time, that a given weld position contains a defect. The system is configured to raise alarms or possibly shut down welding depending on the likelihood that a defect has been created. The system defines threshold shape deviations for the weld molten pool (edges) and the weld ripple shape and fillet geometry. FIG. 4 is an exemplary camera image of the weld molten pool, showing the system identifying a shape of the edges via image processing. FIGS. 5 and 6 are exemplary views of the weld ripple shape and fillet geometry being identified by the system in real-time. When the thresholds are exceeded, the system identifies a potential weld defect. Most critical welds that could benefit from this system involve post-weld non-destructive testing. It is thus possible to continue the learning phase and refine the system calculation tools after each production weld. That is, each set of data can be correlated with video and process data to improve the tools for identifying weld defects.

The system improves the probability of defect detection, enabling operators to push flaw-size "envelopes" with more confidence that critical flaws will not escape the production facility. Additionally, the cycle time to repair a defect can be reduced from several weeks or more to as little as a few minutes. Still further, the system can permit the use of less experienced welders and/or can enable welding by fewer operators.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of detecting weld defects in real time, the method comprising:
    (a) conducting a mock-up welding operation in a learning phase including,
        (1) using a welding torch, welding a first part to a second part,
        (2) a first camera capturing images of a weld molten pool,
        (3) a second camera capturing images of a weld ripple shape and fillet geometry,
        (4) correlating the images captured in (2) and (3) with a weld position,
        (5) performing weld testing on a weld resulting from the welding in (1) and characterizing any defects in the weld, and
        (6) correlating the characterized defects with deviations in the images captured in (2) and (3); and
    (b) the first camera capturing images of a production weld molten pool during a production weld operation;
    (c) the second camera capturing images of a product weld ripple shape and fillet geometry during the production weld operation; and
    (d) processing the images captured in (b) and (c) and computing an aggregate probability that a weld position corresponding to the images captured in (b) and (c) contains a defect based on the characterized defects correlated in (6).

2. A method according to claim 1, further comprising, after step (d), outputting an alert or disabling the production weld operation based on the aggregate probability.

3. A method according to claim 1, wherein step (a)(6) is practiced by parameterizing a shape of the weld molten pool and the weld ripple shape and fillet geometry.

4. A method according to claim 3, further comprising, before step (a)(4), capturing images of a shape and location of refractory contaminants in the weld motel pool, and wherein step (a)(6) further comprises parameterizing the shape and location of the refractory contaminants.

5. A method according to claim 1, further comprising repeating steps (a)(2)-(a)(6) using the images captured in (b) and (c).

6. A method according to claim 1, wherein the production weld operation is performed by depositing weld metal in a plurality of overlapping passes by TIG torches that fill an annular groove in a turbine rotor, and wherein the weld position is determined by a circumferential angle and a radial depth.

7. A method according to claim 1, wherein step (a)(5) is practiced offline by ultrasonic testing or by destructive testing methods.

8. A method according to claim 1, wherein step (a)(1) is practiced to deliberately perform the welding step outside of normal parameters to artificially create defects.

9. A method according to claim 1, wherein step (a)(6) is practiced by defining threshold shape deviations for the weld molten pool and the weld ripple shape and fillet geometry.

10. A method of detecting weld defects in real time, the method comprising:
    (a) correlating potential weld defects with images of a mock weld molten pool and images of a mock weld ripple shape and fillet geometry;
    (b) depositing weld metal into an annular groove in a production weld operation;
    (c) a first camera capturing images of a production weld molten pool during the production weld operation;
    (d) a second camera capturing images of a production weld ripple shape and fillet geometry during the production weld operation; and
    (e) processing the images captured in (c) and (d) and computing an aggregate probability that a weld position corresponding to the images captured in (c) and (d) contains a defect based on the potential defects correlated in (a).

11. A method according to claim 10, further comprising, after step (e), outputting an alert or disabling the production weld operation based on the aggregate probability.

12. A method according to claim 10, further comprising performing weld testing on a weld resulting from the depositing in (b), and correlating additional weld defects using the images captured in (c) and (d).

13. A method according to claim 10, wherein the production weld operation is performed by depositing weld metal in a plurality of overlapping passes by TIG torches that fill the annular groove in a turbine rotor, and wherein a weld position is determined by a circumferential angle and a radial depth.

14. A method according to claim 10, wherein step (e) is practiced by analyzing an edge shape of the production weld molten pool.

15. A method according to claim 14, wherein step (e) is practiced by analyzing a leading edge shape of the production weld molten pool and a trailing edge shape of the production weld molten pool.

16. A system for detecting weld defects in real time, the system comprising:
    a welding torch that enables weld metal to be deposited into an annular groove in a production weld operation;
    a first camera positioned adjacent the welding torch and adjacent a part to be welded, the first camera capturing images of a production weld molten pool during the production weld operation;
    a second camera positioned farther from the welding torch than the first camera and downstream from the welding torch, the second camera capturing images of a production weld ripple shape and fillet geometry during the production weld operation;

a processor receiving the images captured by the first and second cameras; and a database storing correlated potential weld defects with images of a mock weld molten pool and images of a mock weld ripple shape and fillet geometry, wherein the processor communicates with the database and is programmed to process the images captured by the first and second cameras and to compute an aggregate probability that a weld position corresponding to the images captured by the first and second cameras contains a defect based on the potential defects correlated in the database.

17. A system according to claim 16, wherein the first camera comprises two cameras including a leading edge camera that is positioned to capture images of the molten pool leading edge, and a trailing edge camera that is positioned to capture images of the molten pool trailing edge.

18. A system according to claim 16, wherein the annular groove is defined in a turbine rotor, wherein the weld metal is deposited in a plurality of overlapping passes by TIG torches that fill the annular groove in the turbine rotor, and wherein a weld position is determined by a circumferential angle and a radial depth.

* * * * *